United States Patent
Matsumura et al.

(10) Patent No.: US 7,008,514 B2
(45) Date of Patent: Mar. 7, 2006

(54) DOOR OPENING AND CLOSING MECHANISM

(75) Inventors: Seiichi Matsumura, Aichi (JP); Akira Hanahara, Aichi (JP)

(73) Assignee: Sumitomo Heavy Industries Construction Crane Co. Ltd., Aichi (JP)

( * ) Notice: Subject to any disclaimer, the term of this patent is extended or adjusted under 35 U.S.C. 154(b) by 138 days.

(21) Appl. No.: 10/379,366

(22) Filed: Mar. 4, 2003

(65) Prior Publication Data

US 2003/0204995 A1   Nov. 6, 2003

(30) Foreign Application Priority Data

Apr. 26, 2002   (JP)   ............................. 2002-127038

(51) Int. Cl.
B60J 5/06   (2006.01)
(52) U.S. Cl. .................... 196/155; 49/209; 49/213; 49/233
(58) Field of Classification Search ............. 49/209, 49/210, 213, 215, 216, 217, 221, 223, 363; 296/155
See application file for complete search history.

(56) References Cited

U.S. PATENT DOCUMENTS

| 3,332,169 | A | * | 7/1967 | Lohr et al. .................... 49/249 |
| 3,484,993 | A | * | 12/1969 | Erb .............................. 49/216 |
| 3,501,864 | A | * | 3/1970 | Erb et al. ....................... 49/215 |
| 3,900,964 | A | * | 8/1975 | Krein ........................... 49/214 |
| 4,945,677 | A | * | 8/1990 | Kramer ......................... 49/210 |
| 5,140,770 | A | * | 8/1992 | Morvan ......................... 49/215 |
| 5,337,519 | A | * | 8/1994 | Bergesio ........................ 49/351 |
| 5,398,988 | A | * | 3/1995 | DeRees et al. ............. 296/155 |
| 6,030,024 | A | * | 2/2000 | Schmidhuber et al. . 296/146.12 |

FOREIGN PATENT DOCUMENTS

| JP | 5-57273 | 7/1993 |
| JP | 7-10063 | 2/1995 |
| JP | 2000-272346 | 10/2000 |

* cited by examiner

Primary Examiner—Gregory J. Strimbu
(74) Attorney, Agent, or Firm—Flynn, Thiel, Boutell & Tanis, P.C.

(57) ABSTRACT

A durable door opening/closing mechanism that does not require a large space for opening and closing operation such that a door and a main body such as a cab, can be freely designed. To achieve this, the door is supported by links coupled to the cab by joints. One end of the door is guided along the side of the cab by a guide rail. When a rail support begins moving along the side of the cab while being guided by the guide rail, a couple of forces, causing the door to rotate, act on the joints at both ends of the links. The other end of the door is swung out of the cab towards the outside by the couple of forces.

6 Claims, 10 Drawing Sheets

DOOR OPENING AND CLOSING MECHANISM

This patent application claims priority based on Japanese patent application 2002-127038, filed on Apr. 26, 2002, the contents of which are incorporated herein by reference.

BACKGROUND OF THE INVENTION

1. Field of the Invention

The present invention relates to a door opening/closing mechanism having a guide part to guide an opening and closing movement of the door supported by a support part.

2. Related Art

Typical conventional door opening/closing mechanisms are of the hinge type, sliding type, slide rail type, folding door type or swing arm type, which will be shown in the below explanation. Incidentally, the below explanation exemplifies a door that is provided in a cab of a construction machine.

Figure 1A:
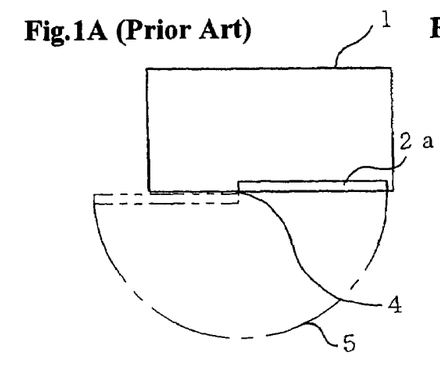
FIGS. 1A and 1B are plan views of a conventional, general hinge-type door opening/closing mechanism.
Figure 1B:
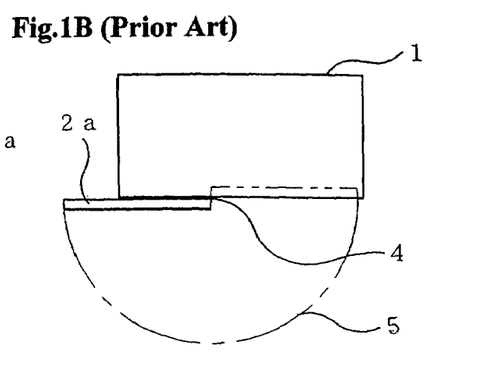
Figure 1C:
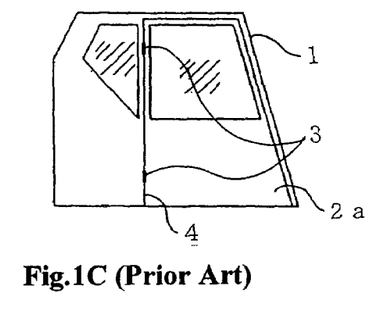
FIGS. 1C and 1D are front views thereof.
Figure 1D:
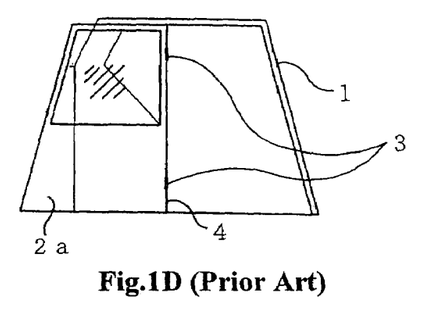

FIGS. 1A and 1B are plan views of a conventional hinge-type door opening/closing mechanism, while FIGS. 1C and 1D are front views thereof. FIGS. 1A and 1C show a door 2a in a closed state and FIGS. 1B and 1D show the door 2a in an opened state. This scheme has hinges 3 as a support part to support the door 2a on a main body 1, as shown in FIGS. 1C and 1D. The door 2a opens and closes along an arcuate track 5 around an axis 4 of the hinge 3.

Figure 2A:
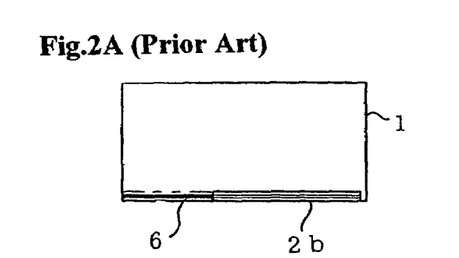
FIGS. 2A and 2B are plan views of a conventional, general sliding-type door opening/closing mechanism.
Figure 2B:
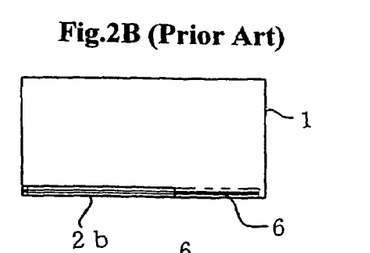
Figure 2C:
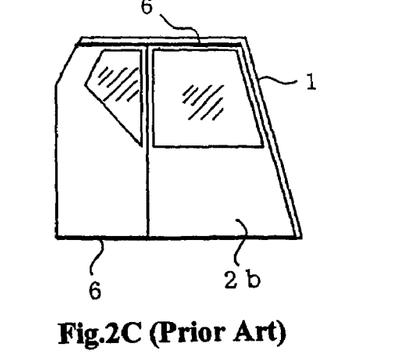
FIGS. 2C and 2D are front views thereof.
Figure 2D:
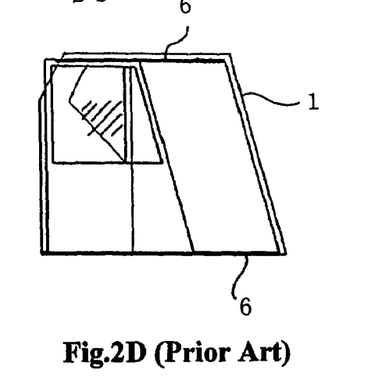

FIGS. 2A and 2B are plan views of a conventional sliding-type door opening/closing mechanism, while FIGS. 2C and 2D are front views thereof. FIGS. 2A and 2C show a door 2b in a closed state and FIGS. 2B and 2D show the door 2b in an opened state. The sliding-type door opening/closing mechanism employs a rail or the like in the guide part to guide the opening and closing movement of the door 2b. Thus, the door 2b is allowed to move horizontally, for opening/closing, on the same plane of a side surface of the main body 1.

Figure 3A:
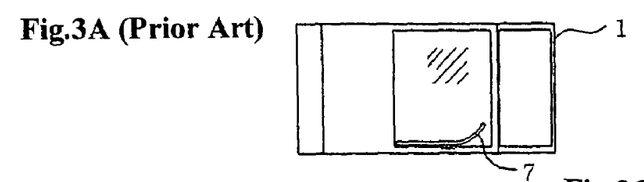
FIGS. 3A, 3B and 3C are plan views of a conventional, general slide-rail type door opening/closing mechanism.
Figure 3B:
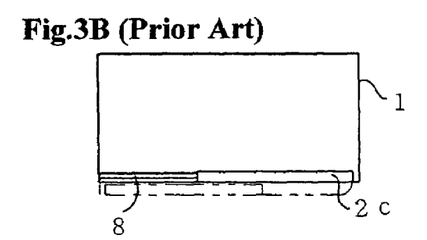
Figure 3C:
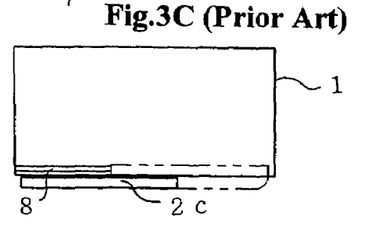
Figure 3D:
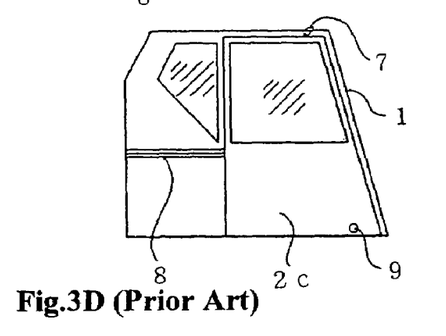
FIGS. 3D and 3E are front views thereof.
Figure 3E:
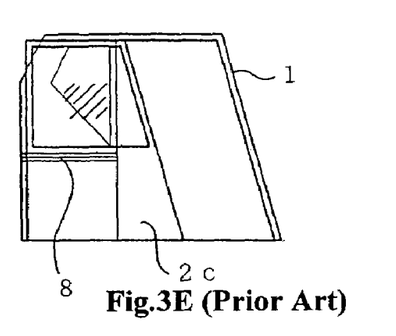

FIGS. 3A–3C are plan views of a conventional, general slide-rail type door opening/closing mechanism, while FIGS. 3D and 3E are front views thereof. FIGS. 3B and 3D show a door 2c in a closed state and FIGS. 3C and 3E show the door 2c in an opened state. The slide-rail type door opening/closing mechanism uses in its guide part a guide 7 curved at one end, to be seen through a top window shown in FIG. 3A, to guide the upper part of the door 2c, a rail 8 shown in FIGS. 3B–3E, and a roller 9 attached on the door 2c. As shown in FIG. 3B–3E, the door 2c is allowed to open and close along the rail 8 while being kept nearly parallel with an outer side surface of the main body 1. The door 2c, in the closed position, comes inward as shown in FIG. 3B because of the curve provided at one end of the guide 7.

Figure 4A:
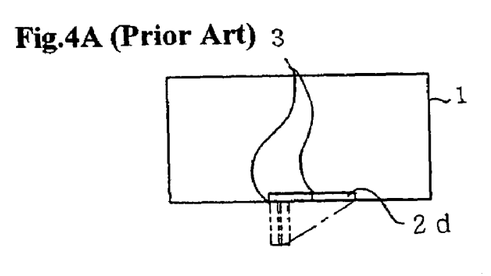
FIGS. 4A and 4B are plan views of a conventional, general folding-type door opening/closing mechanism.
Figure 4B:
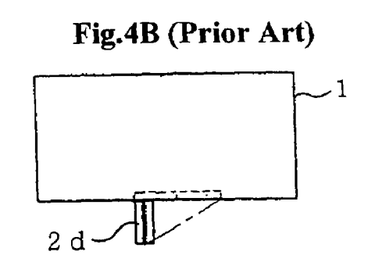
Figure 4C:
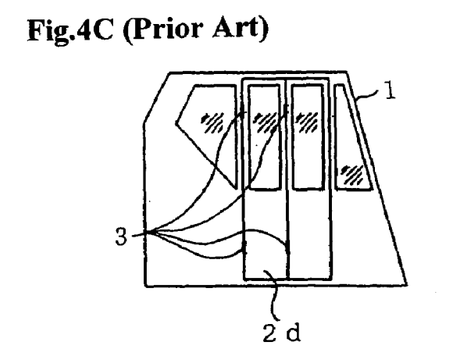
FIGS. 4C and 4D are front views thereof.
Figure 4D:
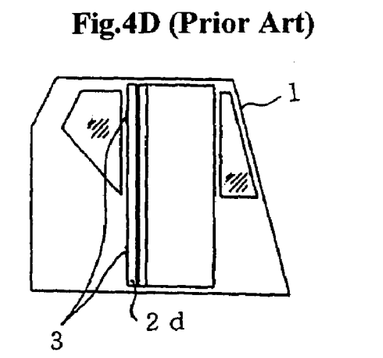

FIGS. 4A and 4B are plan views of a conventional, general folding-type door opening/closing mechanism, while FIGS. 4C and 4D are front views thereof. FIGS. 4A and 4C show a door 2d in a closed state while FIGS. 4B and 4D show the door 2d in an opened state. The folding-type door opening/closing mechanism is structured with the door 2d divided in a plurality of vertical parts as shown in FIGS. 4A–4D. The divisional door parts in plurality are connected to one another by hinges 3 or the like, to connect one end thereof to the main body 1 by hinges 3. By folding the door parts as shown in FIGS. 4B and 4D, the opening and closing operation is performed.

Figure 5A:
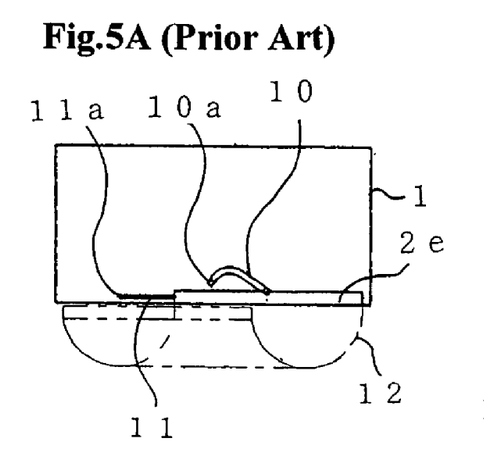
FIGS. 5A and 5B are plan views of a conventional, general swing-arm type door opening/closing mechanism.
Figure 5B:
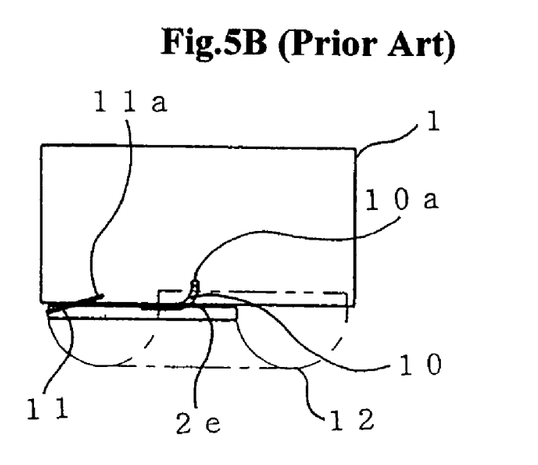
Figure 5C:
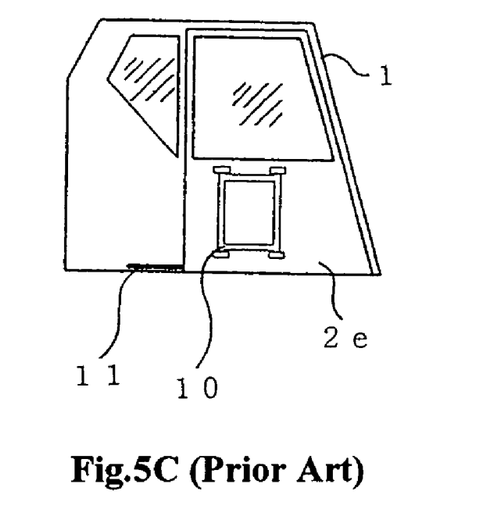
FIGS. 5C and 5D are front views thereof.
Figure 5D:
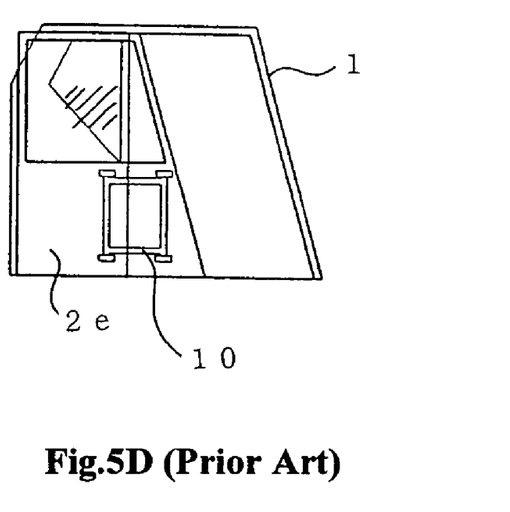

FIGS. 5A and 5B are plan views of a conventional, general swing-arm type door opening/closing mechanism, while FIGS. 5C and 5D are front views thereof showing the arm 10 seen through therein. FIGS. 5A and 5C show a door 2e in a closed state and FIGS. 5B and 5D show the door 2e in an opened state. The swing-arm type door opening/closing mechanism is structured with an arm 10 supporting the door 2e on the main body 1 and a guide rod 11 having nearly the same length as that of the arm 10. As shown in FIGS. 5A and 5B, in this scheme, the arm 10 and the guide rod 11 are allowed to simultaneously rotate around axes 10a, 11a between the respective side and the main body 1. Due to this, the door 2e opens and closes along arcuate tracks 12 around the axes 10a, 11a while being kept nearly in parallel with the side surface of the main body 1.

However, the conventional door opening/closing mechanisms involve the following problems.

The hinge-type door opening/closing mechanism shown in FIGS. 1A–1D is frequently used in buildings, vehicles and the like. However, it requires a large space such as the inside space of the arcuate track 5 during opening and closing, shown in FIGS. 1A and 1B. This increases the amount of swing of the door 2a out of the side surface of the main body 1, and makes the opening/closing operation difficult within a limited space. Also, because the door 2a rotates vigorously if flapped by the wind in its opening/closing operation, a person who holds a grip attached on the door 2a may be swung together with the door 2a. In a construction machine, because the entrance/exit is located high and the step is possibly narrow, there is an increased danger that the person might fall. Meanwhile, when the door 2a is opened, the end of the door 2a projects outward as shown in FIG. 1B. Consequently, when this door mechanism is used in the cab of a construction machine, a door of a machine room which is located at the rear of the cab is not allowed to open by the projected part. Also, because the axis 4 of the hinge 3 projects from the side surface of the main body 1, a loss is caused in respect of unit arrangement in the case that the machine overall width upon transporting is limited as in construction machinery. Furthermore, there is a need to arrange the axes 4 of the upper and lower hinges 3 on one straight line. Due to this, a portion of the door to which the hinges 3 are attached must be in a straight-line form, which imposes a restriction in designing the form of the door 2a.

The sliding-type door opening/closing mechanism shown in FIGS. 2A–2D is also frequently used in buildings, vehicles and the like. This scheme does not require a large space in opening and closing the door 2b. However, as shown in FIGS. 2A and 2B, the rail 6 which guides the movement of the door 2b is always exposed outside so that the rail 6 is readily rusted out and corroded due to rainwater, sea breezes or the like, and adhere with sand, dust or the like, making it impossible to obtain a smooth operation. Consequently, an increased force may be required for opening and closing the door 2b, which possibly leads to trouble. Also, it can be considered that the door 2b can fall off due to a worn-out guide surface in the rail 6. Also, a space where the door 2b moves parallel is needed in the inside of the main body 1. This reduces the efficient space in the inside of the main body 1 corresponding to a door container. Besides, air-tightness is difficult to secure because of the opening/closing mechanism structure for the door 2b to merely slide relative to the main body 1.

The slide-rail type door opening/closing mechanism shown in FIGS. 3A–3E does not require a large space in opening and closing the door 2c. Also, because the door 2c closes inwardly due to guiding by the guide 7, air-tightness is readily secured. However, because the rail 8 is always exposed outside similarly to the sliding type door as shown in FIGS. 3B and 3C, the rail 8 is liable to rust and corrode due to rainwater, sea breezes or the like, and adhere with sand, dust or the like, making it impossible to obtain a smooth operation. Consequently, an increased force may be required in opening and closing the door 2c or deformation or damage in parts may occur due to caught foreign matters, which possibly leads to trouble. Also, because there are many special formed parts, such as the guide 7, the rail 8 and the roller 9, used in the guide part, the attaching part is complicated in the form and parts cost increases. Also, the use of the rail 8 and the roller 9 in guiding the door 2c increases the resistance due to sliding friction, requiring an increased force in opening and closing operations. Meanwhile, it can be considered that the door 2c can fall off due to wear in the guide surface. Also, the rail 8 for guiding the door 2c is centrally positioned in the side surface of the main body 1, injuring the beauty of exterior design. Furthermore, as shown in FIG. 3A, particularly when the door mechanism of this type is applied to a vehicular cab or the like, the curved guide 7 possibly blocks the upper visibility of the top window.

In the folding type door opening/closing mechanism shown in FIGS. 4A–4D, the angle between the door 2d and the main body 1 side surface is nearly 90 degrees when the door 2d is fully opened. Whether the door 2d is folded inward or outward of the cab, the protrusive amount of the door 2d is great, requiring a large opening/closing space. Thus, for a limited space, there are many disadvantages in respect of unit arrangement or entrance/exit space. Meanwhile, for saving space when the door 2d is folded, there is a need to make the door 2d flat with a rectangular outer shape and, as a result, the freedom in exterior design is restricted. As can be seen from FIG. 4C, window frames occupy a large area as the door 2d is divided. This turns out a smaller space for windows. When this type of door mechanism is applied to a vehicle cab, the dead angle increases.

The swing-arm door opening/closing mechanism shown in FIGS. 5A–5D moves while being kept nearly parallel with the side surface of the main body 1. During opening and closing, the door 2e projects outward from the side surface of the main body 1 by an amount corresponding to the length of the arm 10 or guide rod 11. Consequently, in case a person stands in front of the door 2e, the person is hit by the door 2e. Also, it is not convenient in a narrow place such as nearby a wall where there is only a limited space outside the door 2e. Also, the arm 10 is largely curved in order to prevent the arm 10 from contacting the main body 1 when the door 2e is fully opened. Consequently, when the door 2e is closed, the effective space inside the door 2e is limited by the curved arm 10 as shown in FIG. 5A, causing a great loss with respect to interior unit arrangement. Also, the arm 10 is attached generally at the center of the door 2e while the guide rod 11 is attached at the front or rear end of the door 2e. However, because the other end of the door 2e is not restricted, the door 2 chatters when the door 2e is opened and closed.

SUMMARY OF THE INVENTION

The present invention is directed to solve such problems, and provides a door opening/closing mechanism having a support part for supporting a door to a main body and a guide part for guiding movement of the door during opening and closing, wherein the guide part makes one end of the door for opening and closing move along an outer side surface of the main body, the support part supports the door to the main body through joints, and regulates a track which is described, when the guide part guides the one end of the door, by the other end of the door, in an arcuate form.

According to this structure, when the opening/closing end of the door is moved along the outer side surface of the main body by the guide part, a couple of forces which rotate the door act on the joints at both ends of the support part. The other end of the door moves along an arcuate track while being swung out by the couple of forces. Accordingly, the opening/closing end of the door always moves along the outer side surface of the main body whereas the other end of the door swings out of the outer side surface of the main body maximally to arc extension.

Consequently, because the door is swung out by the couple of forces occurring on the support part, the door can be opened and closed by a light operating force. Also, the opening/closing end of the door does not protrude from the side of the main body, a constant opening/closing space is always secured on the one end side of the door. Even where the outside of the door is narrow, opening/closing operation is facilitated. A person or object can easily enter and exit. Meanwhile, because the protrusive amount of the other end of the door from the side of the main body is suppressed to nearly the arc extension, the door can be opened and closed even where the opening/closing space at the outside of the door is narrow.

Meanwhile, because the door is always supported to the main body by the support part, there is no fear that the door falls out as encountered in the conventional slide or slide-rail door opening/closing mechanism. Also, because, unlike the conventional slide door opening/closing mechanism in which the door merely slides over the main body, the invention has the structure to put the lid on the opening of the main body by the door so it is easy to secure air-tightness in the main body. Also, there is no restriction in exterior design, i.e. it is not necessary to make the hinge attaching region of the door in a straight-line form as in the conventional hinge-type door opening/closing mechanism, or to expose the rail to the side of the main body as in the conventional slide-rail type door opening/closing mechanism. Also, there is no possibility of flapping by the wind during opening and closing the door as encountered in the hinged door opening/closing mechanism. Furthermore, the hinge axis does not project to the side of the main body, thereby not causing any loss in respect of unit arrangement. Meanwhile, because the other end of the door is restricted in movement by the support part, there is no chatter in the door when it is opened and closed.

Also, in the invention, the support part is structured by multiple links supporting the door to the main body through joints and coupled one another by joints and a rod linked between the door and the main body to regulate a track described by the other end of the door in an arcuate form, and the guide part is structured by a guide rail provided inside of the main body along the outer side surface of the main body and a rail support moving along the guide rail in a coupled state to the one end of the door through a joint.

According to this structure, the opening/closing end of the door is guided together with the rail support coupled through the joint and moved along the outer side surface of the main body by the guide rail. A couple of forces to rotate the door act on the joints at both ends of the multiple link. The other end of the door describes an arcuate track while being swung out by the couple of forces. On this occasion, the multiple pieces of links in a bent state support the door to the main body. The rod regulates a maximum of an arc extension of the track described by the other end of the door to its length.

Also, the guide rail and rail support comprising the guide part are positioned inside of the main body.

Consequently, the amount that the other end of the door extends from the side of the main body can be adjusted by selecting the length of the rod. It is possible to set the extension amount of the other end of the door depending on a set-up situation of the door. Furthermore, because the guide rail and the rail support are positioned within the main body, the external environment outside the main body does not affect the internal of the main body. As a result, the guide rail is not hindered in its smooth guide function due to rust-out or sand-dust adhesion as encountered in the conventional mechanisms.

Also, in the invention, the support part is structured by a single piece of link supporting the door to the main body through the joints, and the guide part is structured by a guide rail provided inside of the main body along the outer side surface of the main body and a rail support moving along the guide rail in a coupled state to the one end of the door through a joint.

According to this structure, the opening/closing end of the door is also guided together with the rail support and moved along the outer side surface of the main body by the guide rail. A couple of forces act on the joints at both ends of the single link. The other end of the door describes an arcuate track while being swung out by the couple of forces. On this occasion, the single link supports the door to the main body and regulates a maximum of an arc extension of the track described by the other end of the door to its length. Also, the guide rail and rail support comprising the guide part is positioned inside of the main body.

Consequently, the single link also has the function of the rod, so it is possible to omit the rod. As a result, the door opening/closing mechanism becomes simple, and there is an increased merit in respect of manufacture cost or maintenance of the mechanism. Also, in this structure, because the guide rail and the rail support comprising the guide part are positioned within the main body, there is no possibility that the guide rail loses the smooth guide function.

Furthermore, in the invention, the support part supports generally a center-of-gravity position of the door.

According to this structure, the load of the door is mainly burdened by the support part, to reduce the burden on the guide part. Therefore, the door can be stably supported by the support part.

Consequently, there is a decrease in the operating resistance acting on the guide part during opening and closing the door. The door can be opened and closed by a light operating force, owing to the couple of forces caused on the joints at both ends of the support part. As a result, wear and deformation or the like rarely occurs at each region of the support part and guide part, and the door can be smoothly opened and closed over a long term.

Also, in the invention, the guide rail has an end, for determining a closing position of the door, curved from a side of the main body towards the inner side of the main body.

According to this structure, immediately before the closing of the door, the movement of the door in relation to the main body is changed by a curved portion of the guide-rail from a state caused by a straight-line portion of the guide-rail to be nearly in parallel with the side surface of the main body into a rectangle angle to the side surface of the main body.

Consequently, in the case that an elastic member, such as rubber, for improving the air-tightness in the main body is provided between the door and the main body, when the door is closed, the pressure closing the door is exerted on the elastic member at an angle nearly rectangle to the side of the main body. As a result, the attached elastic member is deformed without unnatural strain and the life of the elastic member is prolonged. Also, because the elastic member is unlikely to strip off and become out of shape, air-tightness is secured over a long term.

Also, in the invention, the joints are spherical joints for free rotation.

According to this structure, when conducting repair due to a worsened attaching state of the door, deformation of the door or the like, the dimensional error delicately occurring on the repaired door can be absorbed by free rotation of each of the joints around a center of its sphere. Also, repair and adjustment is not a necessity for both the door and the main body required in the conventional slide door opening/closing mechanism, only for the door.

Accordingly, it is easy to repair the door attachment, deformation or the like.

BRIEF DESCRIPTION OF THE DRAWINGS

FIGS. 13A–13G show modifications to the door opening/closing mechanism according to the invention, wherein

DESCRIPTION OF THE PREFERRED EMBODIMENT

Explanation will now be made on a case that a door opening/closing mechanism according to one embodiment of the present invention comprising a support part having a two-joint link and a rod and a guide part having a curved guide rail is applied to a mobile crane.

Figure 6:
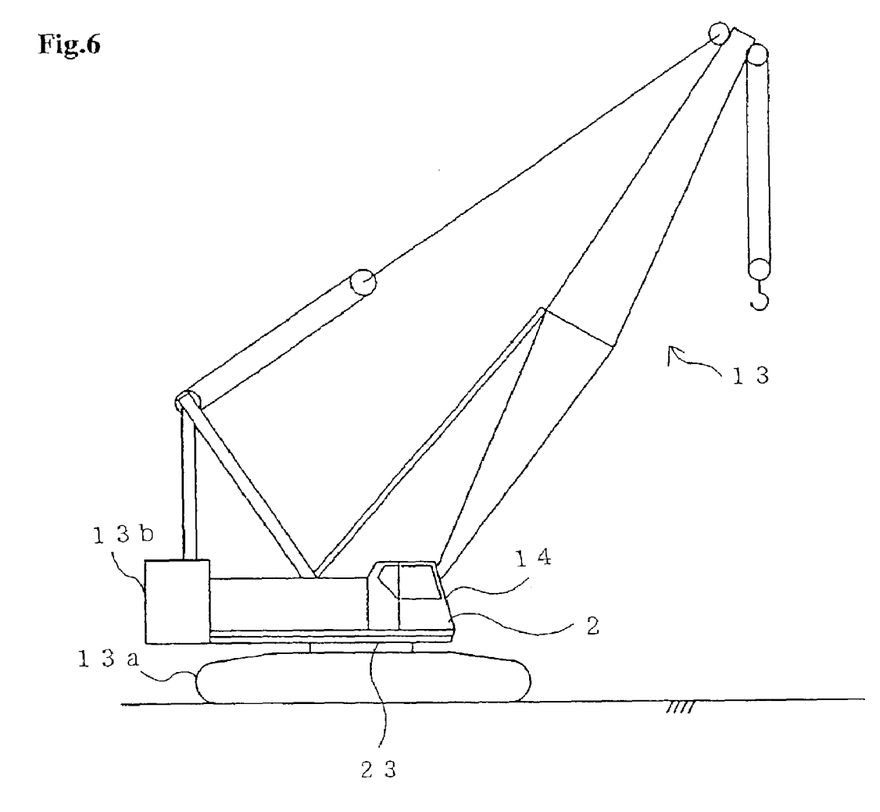
FIG. 6 is a side view of a crawler crane to which a door opening/closing mechanism according to one embodiment of the present invention is applied.

FIG. 6 is a side view of a crawler crane 13 to which a door opening/closing mechanism according to the present embodiment is applied. The crawler crane 13 is structured with a base carrier 13a and a revolving super structure 13b mounted thereon. The revolving superstructure 13b has a cab 14 provided for an operator to get aboard. In getting on the cab 14, the operator first mounts a step 23 and then opens a door 2 provided in the cab 14.

Figure 7A:
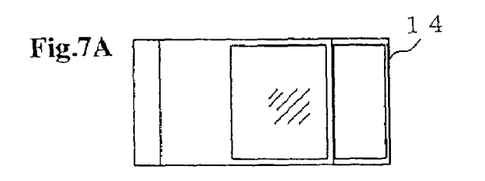
FIG. 7A is a plan view of a cab of the crawler crane shown in FIG. 6.
Figure 7B:
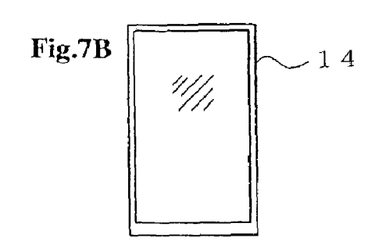
FIG. 7B is a front view thereof.
Figure 7C:
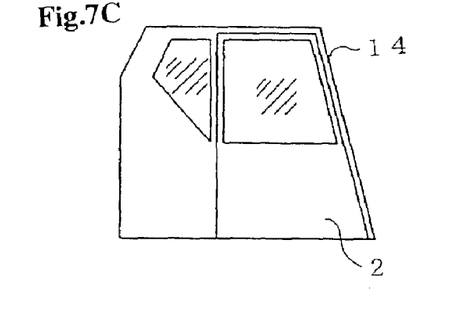
FIGS. 7C and 7D are side views thereof.
Figure 7D:
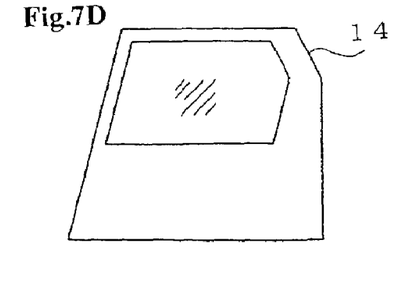

FIGS. 7A–7D show an exterior view of the cab 14 of the crawler crane 13. FIG. 7A is a plan view of the cab 14, FIG. 7B is a front view thereof, and FIGS. 7C and 7D are respectively a left side view and a right side view of the same. The door 2 appears in the left side view in FIG. 7C.

Figure 8A:
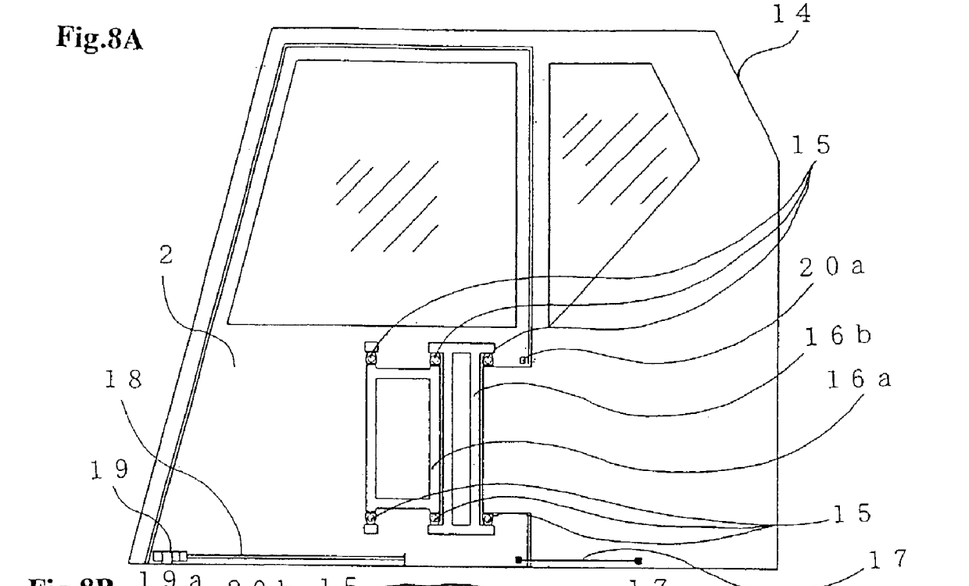
FIG. 8A is a front view of a door opening/closing mechanism according to one embodiment of the invention as viewed from inside the cab.
Figures 8B, 8C:
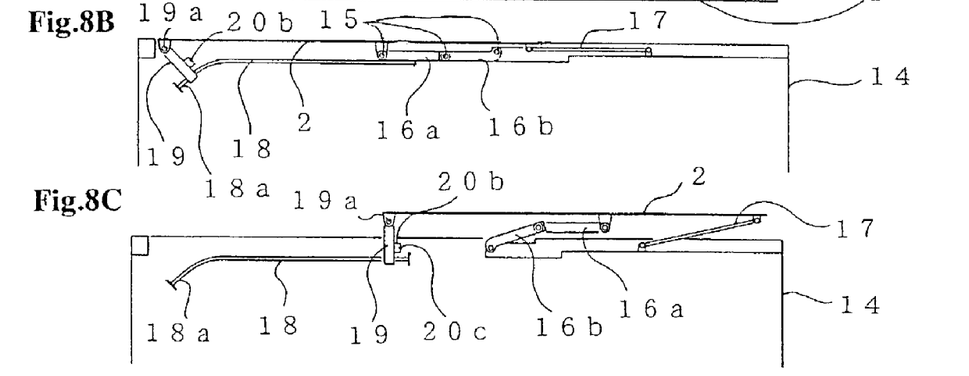
FIG. 8B is a plan view thereof when the door is closed.
FIG. 8C is a plan view thereof when the door is opened.

FIG. 8A is a front view of the door opening/closing mechanism of this embodiment as viewed from inside of the cab 14. FIG. 8B is a plan view of the door opening/closing mechanism of the embodiment in a state that the door 2 is closed. FIG. 8C is a plan view of the door opening/closing mechanism of the embodiment in a state that the door 2 is opened.

In the door opening/closing mechanism of the present embodiment, a guide rail 18 and a rail support 19 constitute a guide part for moving one end of the door 2 for opening and closing along an outer side surface of the cab 14. Links 16a, 16b and a rod 17 constitute a support part for supporting the door 2 to the cab 14 and regulating a track which is traveled, when the guide part guides the one end of the door 2, by the other end of the door 2 in an arc form. The door 2 is supported to the cab 14 by two links 16a, 16b. The links 16a, 16b define a sequence of movement, as hereinafter referred, by not-shown spring means acting to push the door 2 outside. The link 16a has one end coupled to nearly a center-of-gravity position of the door 2 through a rotatable spherical joint 15, and the other end coupled to one end of link 16b through a similar spherical joint 15. The other end of the link 16b is coupled to the cab 14 by a similar spherical joint 15 and positioned offset outwardly as shown in FIG. 8B.

In the lower part of the door 2, there are provided a guide rail 18 for allowing the one end of the door 2, shown left in the figure, to move along the outer side surface of the cab 14, and a rod 17 regulating a track traveled by the other end of the door 2, shown right in the figure, in an arc form. The rod 17 is linked between the door 2 and the cab 14, having a length set at approximately one half of an opening and closing stroke of the door 2. Also, the guide rail 18 is attached to the one end of the door 2 in the inside of the cab 14 through the rail support 19. The rail support 19, coupled to the one end of the door 2 through a rotatable spherical joint 19a is allowed to move along the guide rail 18. Incidentally, the guide rail 18 may be laid in the crane main body, e.g. beneath the floor plate of the cab 14.

The guide rail 18 has an end 18a, defining a closure position of the door 2, curved from the side of the main-body of the cab 14 to an inner side of the cab 14. The form of the guide rail 18, which may be a straight-line depending on the situation on the inside of the cab 14, can be designed freely in consideration of tightness between the cab 14 and the door 2. The door 2 has a lock 20a to temporarily fix the door 2 in a closed position. The rail support 19 has a door catcher 20b shown in FIG. 8B. When the door catcher 20b captures a striker 20c shown in FIG. 8C, the door 2 is temporarily fixed in an open position. Incidentally, the door catcher 20b is not limitedly attached on the rail support 19 but may be directly mounted on the door 2.

As shown in FIG. 8A, two joints 15 are provided in a height direction at each connecting portion between the link 16a and the door 2 or between the link 16b and the cab 14. In a closed position of the door 2 as shown in FIG. 8B, the support part and the guide part are arranged along the inner surface of the cab 14 in a state that it is substantially in the same plane as the inner surface.

Figures 9A, 9B:
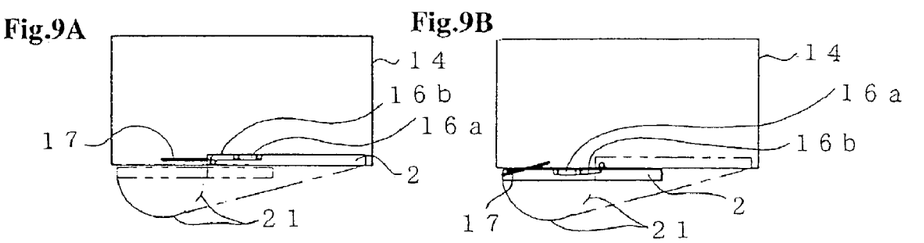
FIGS. 9A and 9B are plan views of a door opening/closing mechanism according to one embodiment of the invention when a door is closed and opened, respectively.
Figure 9C:
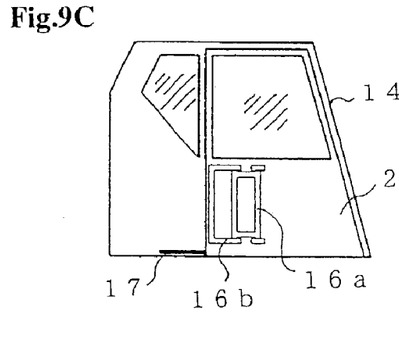
FIGS. 9C and 9D are side views thereof when the door is closed and opened, respectively.
Figure 9D:
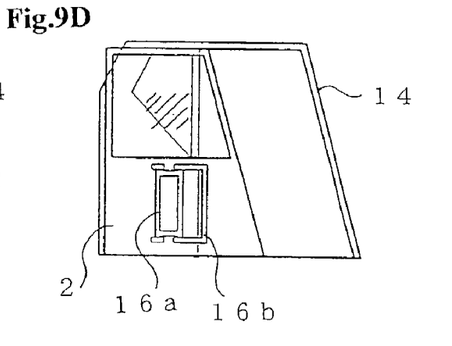

FIG. 9A is a plan view of the cab 14 when the door 2 is closed, while FIG. 9B is a plan view of the same when the door 2 is opened. FIG. 9C is a perspective side view of the cab 14 as viewed from the outside when the door 2 is closed, while FIG. 9D is a perspective side view of the cab 14 as viewed from the outside when the door 2 is opened. In both FIGS. 9C and 9D, the links 16a, 16b are perspective. Note that, in FIGS. 9A–9D, the same elements as those in FIGS. 8A–8C are attached with the same references and the explanation is omitted. As described above, during opening and closing the door 2, one end of the door 2 is always moved along the outer side surface of the cab 14 by the guide rail 18 and rail support 19, the other end of the door 2, shown by the chain line in FIGS. 9A, 9B, travels a track 21 of an arc.

Figure 10A:
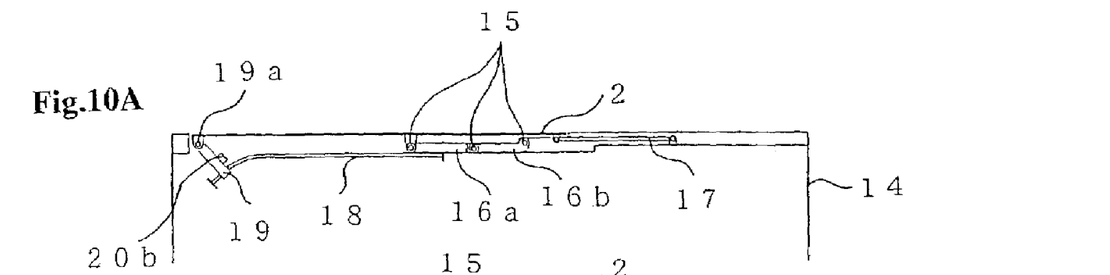
FIG. 10A is a plan view showing the state that a door is completely closed, in an opening/closing operation of the door according to the door opening/closing mechanism in one embodiment of the invention.
Figures 10B, 10C, 10D:
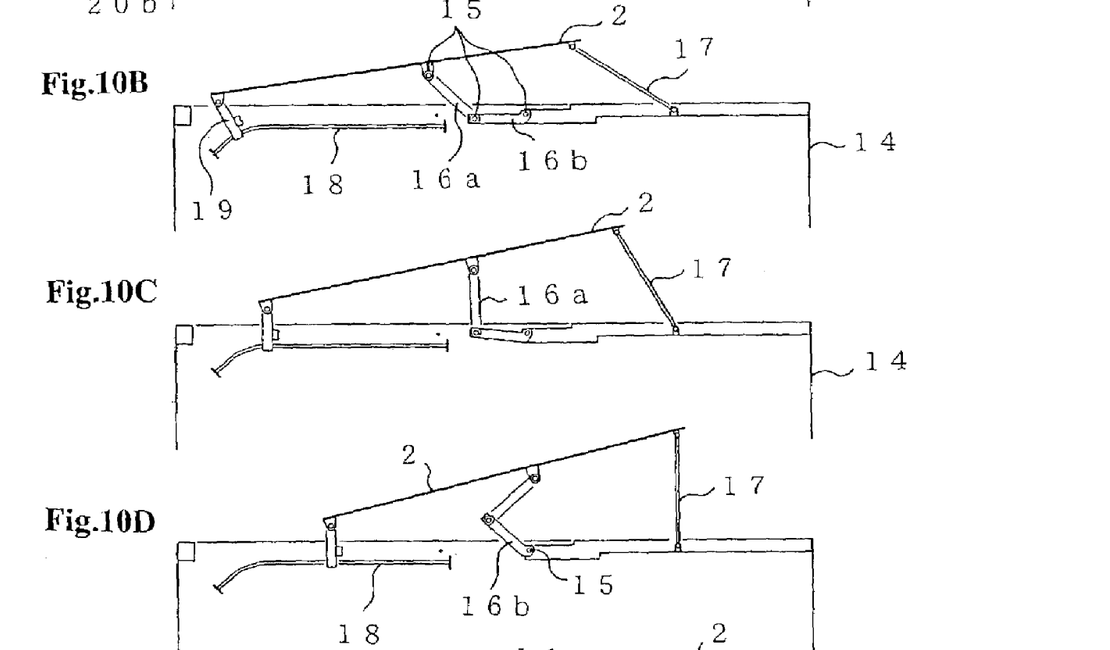
FIGS. 10B–10E are plan views thereof during opening and closing the door.
Figure 10E:
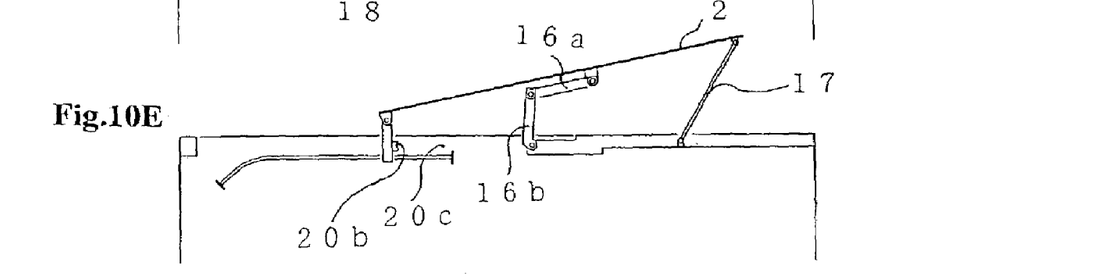
Figure 10F:
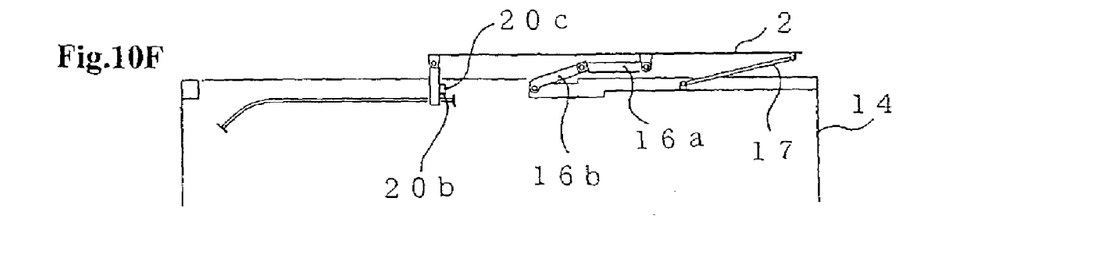
FIG. 10F is a plan view showing the full opening state of the door.

In this structure, the door 2 is opened and closed in a manner as shown in FIGS. 10A–10F. FIGS. 10A–10F show the opening and closing operation of the door 2, in 6 stages, according to the door opening/closing mechanism of the embodiment. FIG. 10A shows the door 2 completely closed, FIGS. 10B–10E show the states in the course of the door 2 being gradually opened, and FIG. 10F shows a state of the door 2 being fully opened. Note that, in FIGS. 10A–10F, the same elements as those of FIGS. 8A–8C are attached with the same references and explanation thereof being omitted.

In a state of FIG. 10A, as the lock 20a of the door 2 is released and the opening/closing end of the door 2 begins to open, the rail support 19 is guided by the guide rail 18 and caused to move together with the one end of the door 2 toward the right in the figure along the outer side surface of the cab 14, as shown in FIG. 10B. At this time, a couple of forces act on the joints 15 at both ends of the links 16a and 16b, to cause rotational motion of the door 2. The other end of the door 2 is swung out of the cab 14 by the couple of forces. At the same time, the rod 17 is swung out, together with the other end of the door 2, around the axis in the outer side surface of the cab 14. As for the links 16a, 16b, only the link 16a is first swung out as shown in the figure.

The other end of the door 2, as shown in FIG. 10C, increasingly swings out of the outer side surface of the cab 14 while traveling an arcuate track. Simultaneously, the one end of the door 2 moves rightward in the figure along the outer side surface of the cab 14. At this time, the link 16a is maximized in its swing amount. As the one end of the door 2 is further operated rightward in the figure, the rod 17 increases the angle relative to the outer side surface of the cab 14 as shown in FIG. 10D, reaching a maximized swing amount out of the outer side surface of the cab 14. From then on, the link 16b is swung out around the joint 15 in the outer side surface of the cab 14.

When the door 2 reaches a position shown in FIG. 10E, the link 16a is brought into abutment against the inner surface of the door 2 and stops rotating. Then, with the movement of the door 2, only the link 16b continues rotating rightward in the figure while being restricted by the rod 17. When the one end of the door 2 is further operated toward the right to reach a position shown in FIG. 10F, the link 16b and the rod 17 stop rotating whereby the door 2 is fully opened and nearly parallel with the side surface of the cab 14. On this occasion, because the door catcher 20b captures the striker 20c, the door 2 is fixed in an opened state. Meanwhile, at this time, because one end of the link 16b on the side of the cab 14 is offset outwardly, the cab 14 and the links 16a, 16b can be prevented from contacting with each other.

The operation of closing the door 2 is done in the order reverse to that of opening the door 2. In this case, the movement of the door 2 relative to the cab 14 is as follows. Namely, the movement of the door 2, immediately before closure, is changed by the curved portion of the guide rail 18 from a state nearly parallel with the guide rail 18 to an angle toward a right angle to the main-body side surface of the cab 14.

According to the door opening/closing mechanism of the embodiment, when the opening/closing end of the door 2 moves along the side surface of the cab 14 by the guide rail 18 as described above, a couple of forces act on the joints 15 at both ends of the links 16a, 16b to cause rotational movement of the door 2. At this time, the other end of the door 2 travels an arcuate track while being swung out by the couple of forces. Consequently, the opening/closing end of the door 2 is allowed to always move along the outer side surface of the cab 14 whereas the other end of the door 2 swings, maximally to an arc extension, out of the side surface of the cab 14. Thus, because the door 2 is swung out by the couple of forces acting upon the links 16a, 16b, the door 2 can be opened and closed by a light operation force. Meanwhile, because of no protrusion at the opening/closing end of the door 2 from the side surface of the cab 14, a constant opening/closing space is always secured on the side of the one end of the door 2, allowing the operator to get on/out with safety. Also, because the swing of the other end of the door 2 out of the side surface of the cab 14 can be suppressed nearly to an extent of arc extension, the door 2 can be opened and closed even where the opening/closing space is narrow on an outer side of the door 2.

Figure 11A:
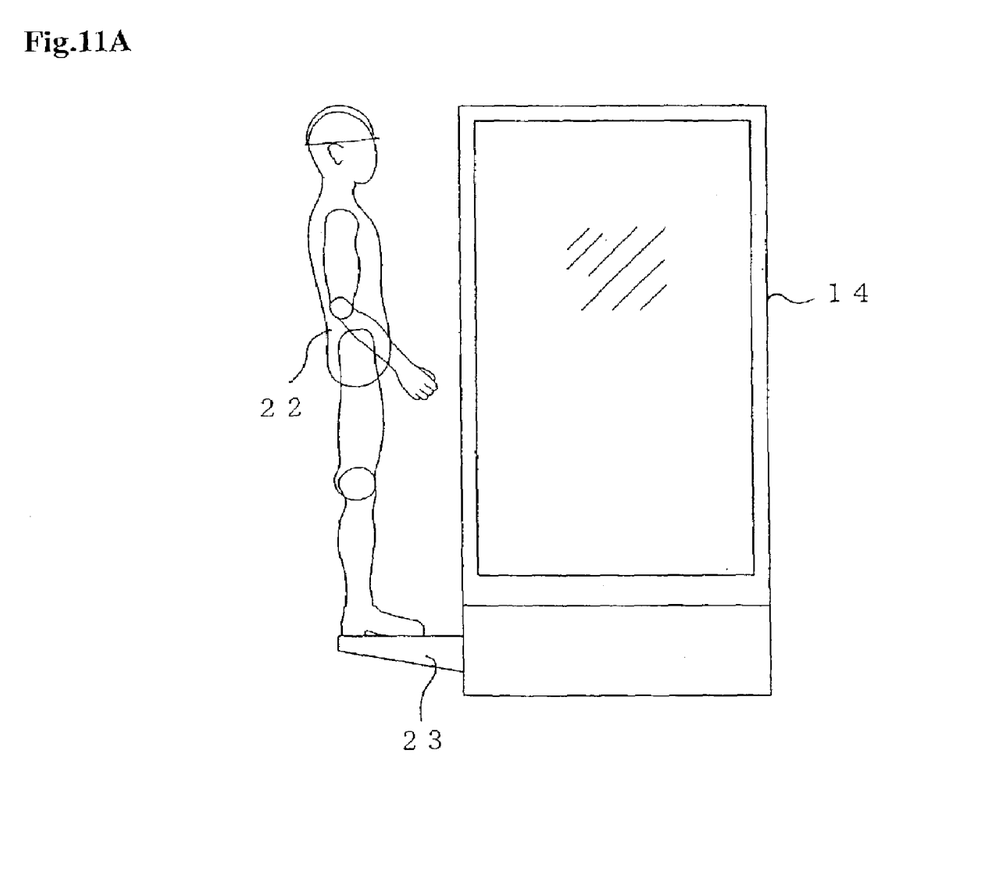
FIG. 11A is a front view showing a state that an operator opens/closes the cab door according to the door opening/closing mechanism of one embodiment of the invention.
Figure 11B:
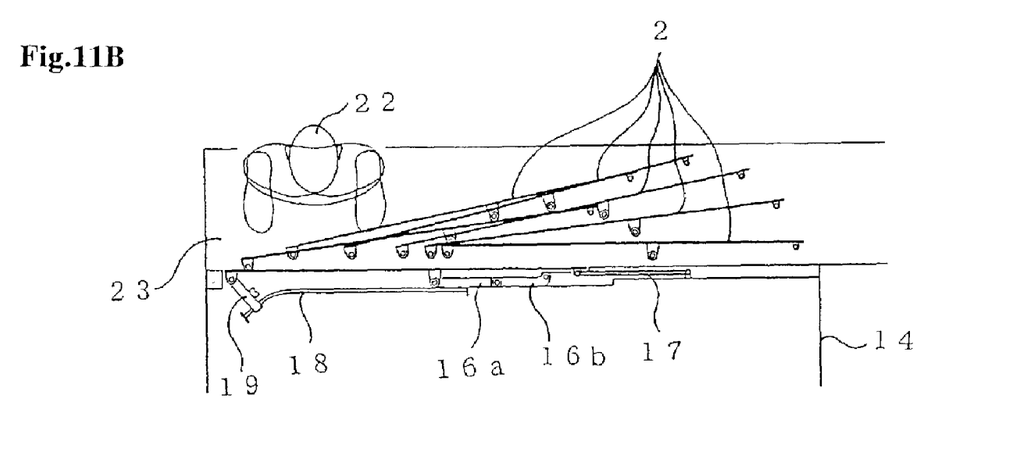
FIG. 11B is a plan view thereof.

FIGS. 11A and 11B show the states of the operator 22 opening and closing the door 2 of the cab 14. FIG. 11A is a front view showing a state that the operator 22 is on the step 23 to open/close the door 2 when the operator 22 gets in/out the cab 12. FIG. 11B is a plan view showing a position of the operator 22 and a track of opening/closing the door 2 when the operator 22 is opening/closing the door 2 of the cab 14. Note that, in FIGS. 11A and 11B, the same elements as those of FIGS. 10A–10F are attached with the same references to omit the explanation thereof. As shown in the figure, the operator 22 can avoid contacting with the opening/closing door 2 by standing on the narrow step 23 of the crawler crane 13 in an opening/closing space secured on one side of the door 2. Accordingly, the operator 22 does not suffer from unstable postures and does not fall off or down.

Meanwhile, because the door 2 is always supported to the cab 14 by the links 16a, 16b, there is no fear that the door 2 falls off as encountered in the conventional slide or slide-rail door opening/closing mechanism. Also, unlike the conventional slide door opening/closing mechanism in which the door 2 merely slides over the cab 14, the present embodiment has the structure to put the lid on the opening of the cab 14 by the door 2 so that it is easy to secure air-tightness in the cab 14. Also, there is no danger that the door flaps by the wind when opening and closing as encountered in the conventional hinge-type door opening/closing mechanism. Furthermore, the axis 4 of a hinge 3 does not project to the side of the main body, and loss is not caused in respect of space or freedom of the unit arrangement within the cab 14. Also, the use of two links 16a, 16b makes it possible to arrange the support part of the door 2 within a space of the cab 14 equivalent to the thickness of the door 2. This improves the machine operation performance and an operator's resident performance in the cab 14. Meanwhile, because the other end of the door 2 is regulated in movement by the links 16a, 16b and rod 17, there is no clatter of the door 2 when opening and closing the door 2.

Figure 12:
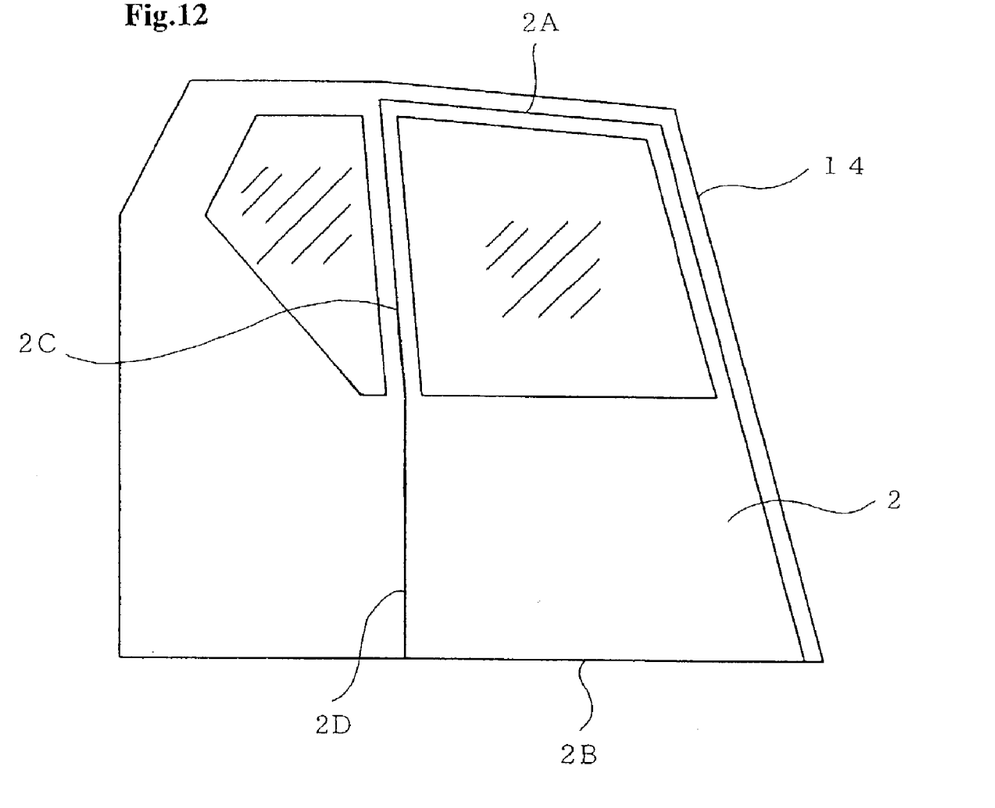
FIG. 12 is a side view showing a door shape design example according to the door opening/closing mechanism of one embodiment of the invention.

Also, there is no possibility of restriction in exterior design, such that a shape of the portion of the door 2a to which the hinges 3 are attached is made in a straight-line shape as encountered in the conventional hinged door opening/closing mechanism or such that the rail 8 is exposed on the side of the main body as in the conventional slide-rail door opening/closing mechanism. Accordingly, it is possible to design the upper side 2A of the door 2 not parallel with the lower side 2B as shown in the left side view of FIG. 12, or to design the left end of the door 2 in a form of two lines 2C, 2D which are polygonal instead of a straight line form. Furthermore, it can be designed in a continuous curved line.

In this embodiment, when the other end of the door 2 moves along an arcuate track while being swung out by a couple of forces, the links 16a, 16b in a bent state support the door 2 to the cab 14 while the rod 17 regulates, by its length, the maximum extension of the arc traveled by the other end of the door 2. Consequently, the swing of the other end of the door 2 out of the side surface of the cab 14 can be adjusted by selecting the length of the rod 17. It is possible to set a swing amount of the other end of the door 2 depending on a set-up situation of the door 2. Furthermore, because the guide rail 18 and the rail support 19 are positioned within the cab 14, the external environment of the cab 14 does not affect the interior of the cab 14. As a result, the guide rail 18 is not hindered in its smooth guide function due to rusting out or sand or dust adhesion as encountered conventionally.

According to the door opening/closing mechanism of this embodiment, because the links 16a, 16b support the door 2 at around its center-of-gravity position, the load of the door 2 is mainly carried by the links 16a and 16b to reduce the burden on the guide rail 18 or rail support 19. Thus, the door 2 is stably held by the links 16a and 16b. This reduces the operating resistance acting on the guide rail 18 and rail support 19 during the opening and closing of the door 2. The door 2 is to be opened and closed by a couple of forces acting upon the joints 15 at both ends of the links 16a, 16b due to a light operation force. As a result, less wear or deformation takes place in each part of the links 16a, 16b, guide rail 18 and rail support 19, allowing the smooth opening and closing of the door 2 over a long term.

According to the door opening/closing mechanism of this embodiment, as noted before, the movement of the door 2 relative to the cab 14 is as follows. Namely, the movement of the door 2 in a state nearly parallel with the side surface of the cab 14 by the straight-line portion of the guide rail 18, at immediately before closing, is changed to an angle toward a right angle to the side surface of the cab 14. Consequently, in the case in which a packing of an elastic member, such as a rubber, is provided between the door 2 and the cab 14 to improve the sealing of the cab 14, when the door 2 is closed, the packing is pressed by a pressure closing the door 2 in nearly a right angle direction to the side surface of the cab 14. Accordingly, the attached packing deforms by the natural strain, increasing the life thereof. Also, because the packing is not readily stripped off and out of shape, stable air tightness can be kept over a long term.

Also, according to the door opening/closing mechanism of the embodiment, the joints 15, 19a are spherical joints for free rotation. Accordingly, when repair is conducted due to a worsened attachment of the door 2 or deformation of the door 2 or the like, the dimensional error delicately occurring on the repaired door 2 can be absorbed by free rotation of each of the joints 15, 19a around a center of its sphere. Also, there is no necessity for the repair and adjustment to include both the door 2 and the main body required in the conventional slide door opening/closing mechanism. Repair and adjustment are satisfactory only for the door 2. Due to this, the door 2 is easy to attach, repair deformation or the like or maintain.

Figure 13A:
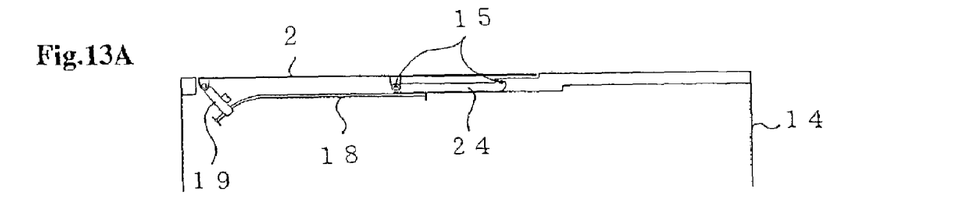
FIG. 13A is a plan view showing a door opening/closing mechanism using a one-piece link, FIG. 13B a plan view showing a door opening/closing mechanism using a three-piece link, FIG. 13C a plan view showing a door opening/closing mechanism using a straight-lined guide rail, FIG. 13D a plan view showing a door opening/closing mechanism using a one-piece link deviating in support position, FIG. 13E a plan view showing a door opening/closing mechanism changed in operation procedure of a two-piece link, FIG. 13F a plan view showing a door opening/closing mechanism using a curved rod, and FIG. 13G a plan view showing a door opening/closing mechanism using a toggle mechanism.

Although the above explanation is for the door opening/closing mechanism using multiple links, as exemplified by the two links, the door opening/closing mechanism of the invention can use a single link 24 to omit the rod 17, as shown in FIG. 13A. Note that, in FIG. 13A, the same elements as those of FIGS. 10A–10F are attached with the same references and explanation thereof is omitted. The opening/closing mechanism of the door 2 is realized by eliminating the rod 17 in FIGS. 8A–8C, and using a single link 24 instead of the two links 16a, 16b.

Also in this structure, when the door 2 begins to open, the rail support 19 coupled to one end of the door 2 is guided by the guide rail 18 to move along the outer surface of the cab 14, similarly to the structure having two links. At this time, a couple of forces, causing rotational motion to the door 2, act on the joints 15 at both ends of the link 24. The other end of the door 2 moves along an arcuate track while being swung out of the cab 14 by the couple of forces. On this occasion, the link 24 supports the door 2 to the cab 14 and regulates, by its length, the maximum value of extension of the arc traveled by the other end of the door 2.

According to the door opening/closing mechanism with the one link 24, the link 24 has also a function of the rod 17, so it is possible to omit the rod 17. As a result, the door opening/closing mechanism is simplified in structure, increasing its merit with respect to manufacturing cost and maintenance of the door opening/closing mechanism.

Incidentally, the above explains the case in which the guide part uses the guide rail 18 and the rail support 19 while the support part uses the two or one link(s), several modifications are to be considered in the invention as shown in FIGS. 13B–13G. Note that, in FIGS. 13B–13G, the same elements as those of FIGS. 10A–10F are attached with the same references and explanation thereof is omitted.

Figure 13B:
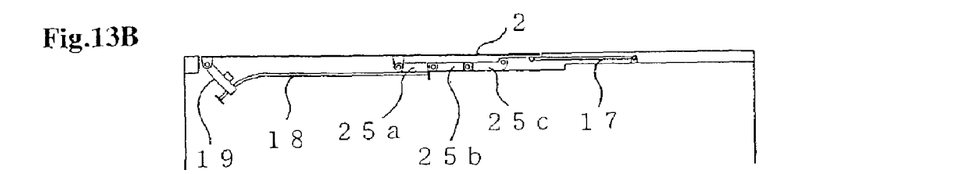
Figure 13C:
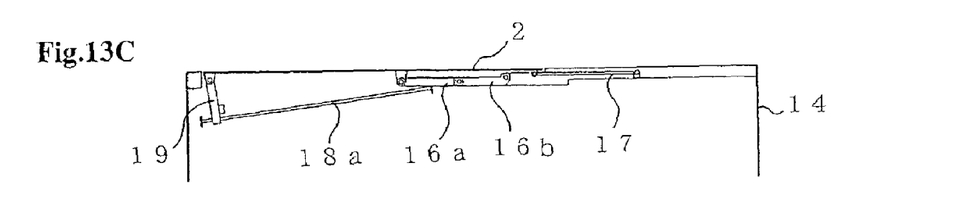
Figure 13D:
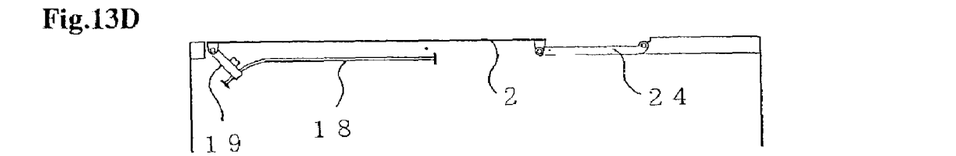
Figure 13E:
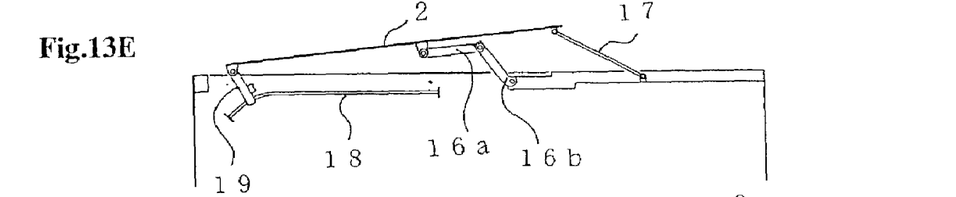
Figure 13F:
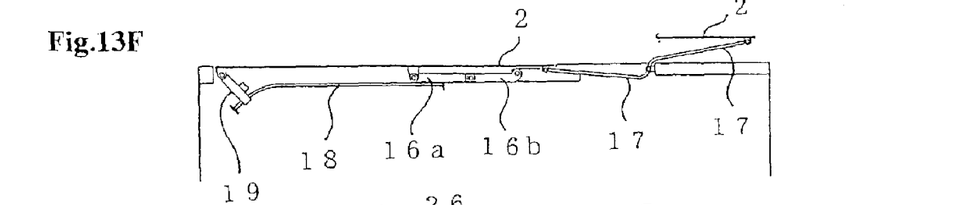
Figure 13G:
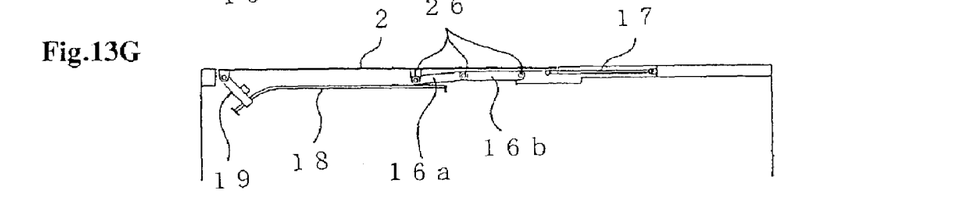

As shown in FIG. 13B, when three links 25a, 25b, 25c are used in the support part of the door 2, an effect is obtained similar to that using two links 16a, 16b. Also, a straight-line guide rail 18a can be used as shown in FIG. 13C, allowing for free forms of design. Meanwhile, although in the above explanation the support part holds nearly the center-of-gravity position of the door 2, there is no limitation in support position for the door 2. As shown in FIG. 13D, a single piece of link 24 can be used to support the end of the door 2. Also, as shown in FIG. 13D, the link 24 can be arranged other than in the outer shape of the door 2. Also, it is possible to invert the operational order of the two links 16a, 16b explained in the embodiment, e.g. the link 16b can be first swung out, as shown in FIG. 13E. Also, the links 16a, 16b may not be given an operational order so that both can rotate simultaneously when the lock 20a shown in FIG. 8A is released. As shown in FIG. 13F, the rod 17, besides the link 16b, is curved at its end to decrease the swing-out amount of the door 2 when the door 2 is fully opened. Also, although the joints in the links 16a, 16b can be freely arranged, as shown in FIG. 13G, a toggle mechanism may be provided in the joints 26 of the links 16a, 16g to omit the lock 20a, 20b, 20c.

Meanwhile, although in the above explanation the guide rod 17 was structured by one rod-formed member, it can be made by a plurality of links such as the links 16a, 16b. Also, the guide rod 17 or link 24 may be structured to expand and contract, as an expansion rod of the automotive antenna or crane's telescope jib. By providing a trigger mechanism or the like for determining the operational sequence of multiple links to cause, when one link rotates a predetermined angle, another link to start swing out, it is possible to omit the guide rail 18 and rail support 19 or the rod 17 or all of them. Also, the lock mechanism which determines the opening/closing position of the door 2 may be arbitrary in its attaching position. The lock may position the rod 17 at the other end of the door 2 or restrict rotation of the link, 16a, 16b, 24. Also, latches or locks can be added to the constituent parts in order to fix the door 2 in an intermediate position.

Meanwhile, although in the above explanation, the joint 15 between the door 2 and the link 16a is positioned in a state aligned with an axis direction of the link 16b in a closed position of the door 2 as shown in FIG. 8B, the joint 15 between the door 2 and the link 16a may be positioned towards the outside of the cap 14 rather than the axis direction of the link 16b in a closed position of the door 2. This positioning makes the swinging out action of the door 2 smooth, when the door 2 is opened.

Meanwhile, the above was explained for the case in which the invention is applied to the cab 14 of the mobile crane 13, the invention is not limited to this but can be similarly applied to the entrance, window, lid or the like of various structures.

Although the present invention has been explained in reference to the embodiments, it is apparent for those skilled in the art that many changes and modifications can be made without departing from the spirit and scope of the invention, as is clear from the following claims.

What is claimed is:

1. A door opening and closing mechanism having a support part supporting a door to a main body and a guide part for guiding movement of the door during opening and closing, of the door the guide part comprising a guide rail provided inside of the main body and beneath a floor plate of the main body along an outer side surface of the main body and a rail support which moves along the guide rail while being coupled to one end of the door through a pivotal joint and guides the one end of the door along the outer side surface of the main body during the opening and closing, of the door and the support part comprising two links which align with each other to approximately form a line when the door is one of opened and closed, one link of said two links being connected at one end thereof to the door through a plurality of pivotal joints which are separated from each other in a vertical direction, the other link being connected at one end thereof to the main body through a plurality of pivotal joints which are separated from each other in the vertical direction and being connected at an opposite end thereof to the one link through a plurality of pivotal joints which are separated from each other in the vertical direction, and a rod connecting the door and the main body for swinging the door away from the outer side surface of the main body and having a lengh which is shorter than the sum of the lengths of the one link and the other link, the rod regulating the movement of the other end of the door to travel along an arcuate path as the guide part guides the one end of the door.

2. A door opening and closing mechanism according to claim 1, wherein the one link substantially supports the center-of-gravity of the door.

3. A door opening and closing mechanism according to claim 1, wherein the guide rail has an end, for determining a closed position of the door, which curves from the outer side surface of the main body toward an inner side of the main body.

4. A door opening and closing mechanism according to claim 1, wherein the joints are spherical joints.

5. A door opening and closing mechanism according to claim 1, wherein the guide rail has an end, for determining a closed position of the door, which curves from the outer side surface of the main body toward an inner side of the main body, and the joints are spherical joints.

6. A door opening and closing mechanism according to claim 1, wherein in a closed position of the door, the support part and the guide part are arranged along an inner surface of the main body and are substantially in the same plane with the inner surface.

* * * * *